FREQUENCY-BAND-REJECTING TRANSMISSION NETWORK

Filed Dec. 27, 1963 2 Sheets-Sheet 1

INVENTORS D. P. BORENSTEIN
L. A. MEACHAM
BY Ray M. Porter Jr.
ATTORNEY 3,346,820

FREQUENCY-BAND-REJECTING TRANSMISSION NETWORK

David P. Borenstein, Redbank, and Larned A. Meacham, Colts Neck, N.Y., assignors to Bell Telephone Laboratories, Incorporated, New York, N.Y., a corporation of New York Filed Dec. 27, 1963, Ser. No. 333,943

11 Claims. (Cl. 330—109)

ABSTRACT OF THE DISCLOSURE

A notched-T filter is disclosed wherein a tuned circuit controls a variable impedance device which is connected between the source and the load. The tuned circuit is connected across the source, and the output of the tuned circuit controls the collector-emitter impedance path of a transistor which serves as the variable impedance device. The tuned circuit, thus, is isolated from the load.

Figure 1:
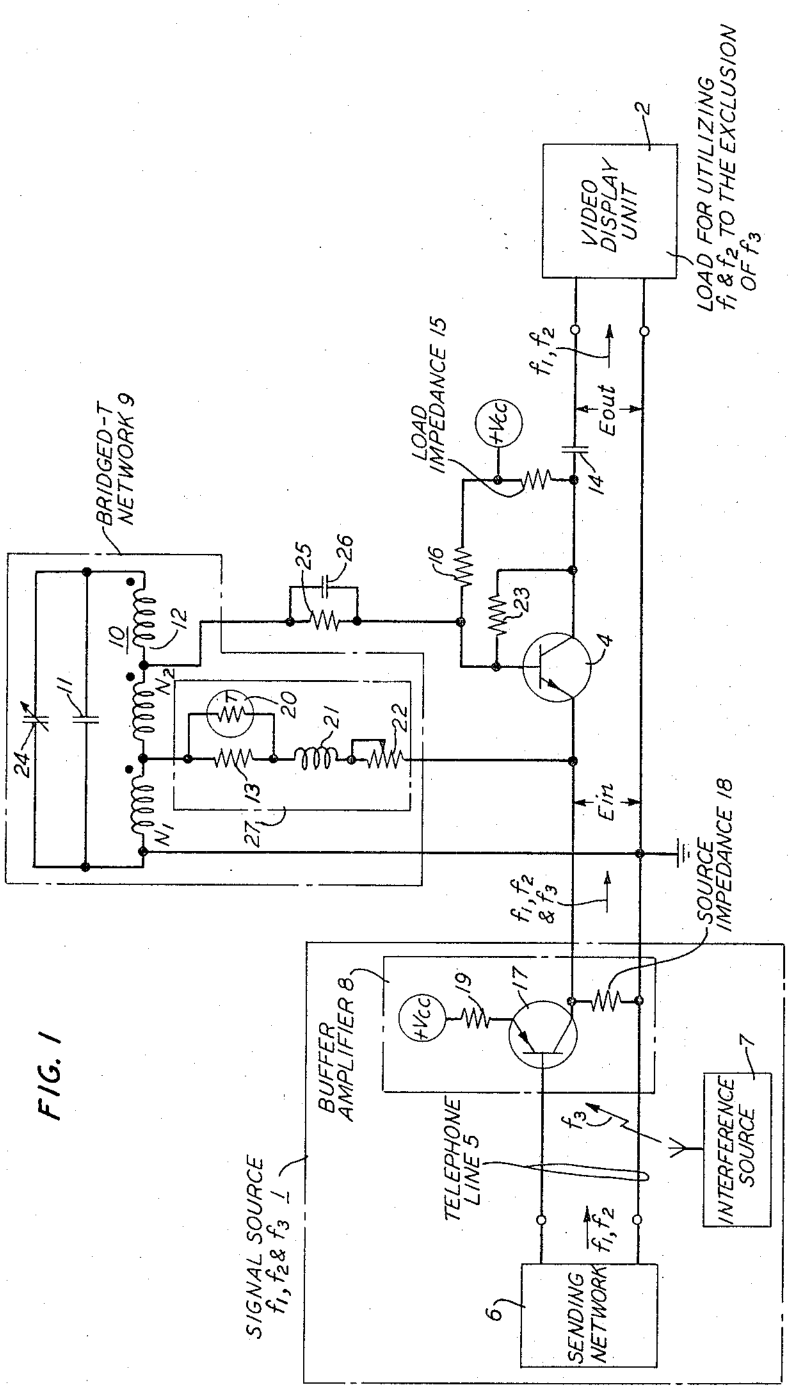

This invention relates to electrical transmission networks and more particularly to filters that reject an extremely narrow band of frequencies.

In many electrical transmission networks, such as telephone networks, voltages are frequently induced from alternating-current power sources and extraneous radiating sources. These voltages interfere with the conversation being transmitted.

It has been further proposed to transmit television pictures of the conversing parties along with the conversation being transmitted by the telephone network. In one form of such a system, the frequency band of the television signals is baseband. That is, the television signals do not modulate a higher frequency carrier wave. The aforementioned interfering voltages have a very deleterious effect on the quality of television picture transmission at baseband frequencies.

Although the frequencies of the principal interfering voltages are frequently constant and well known, prior art transmission networks or filters that reject such frequencies are unsuitable for use in a videotelephone system because they reject too wide a band of frequencies, or fail to provide constant transmission for all other frequencies in the video signal, or are too complex and expensive for widespread use in a telephone system.

It is therefore an object of the invention to provide an improved transmission network that rejects a narrow band of frequencies while providing uniform transmission characteristics for wide bands of frequencies adjacent to the rejected band of frequencies.

A further object of the invention is to provide a simple, inexpensive frequency-band-rejecting filter that is ideally adapted for eliminating interfering frequencies in a video telephone system.

According to the invention, a source of communication signals having frequencies $f_1$ and $f_2$ and of an interfering signal having the frequency $f_3$ is coupled across the series combination of a communication receiver and a variable transmission path such as the emitter-collector circuit of a transistor. The input of a bridged-T circuit that is resonant at the frequency $f_3$ is coupled across the source, and the output of the bridged-T circuit is connected across the base-emitter circuit of the transistor. The bridged-T circuit is adjusted so that its transmission approaches a null condition at the frequency $f_3$, but maintains a slight negative feedback through the transistor to the bridged-T circuit input at the frequency $f_3$.

As a feature of the invention, the bridged-T circuit is arranged so that a tuning inductance provides a low impedance path at the frequencies $f_1$ and $f_2$ between the transistor base electrode and one side of the signal source.

The transistor appears essentially in a common base configuration, that is, the emitter-collector circuit is connected between the opposite side of the source and the load at the frequencies $f_1$ and $f_2$ and provides essentially uniform transmission throughout a broad band of frequencies in either direction from $f_3$, as is essential in a videotelephone system. It is noted that a vacuum tube might be used in an analogous manner; i.e., the grid being essentially "grounded" through the tuning inductance at the frequencies $f_1$ and $f_2$. The so-called "grounded grid" configuration of a vacuum tube transmission network is characterized by excellent bandwidth.

Figure 2:
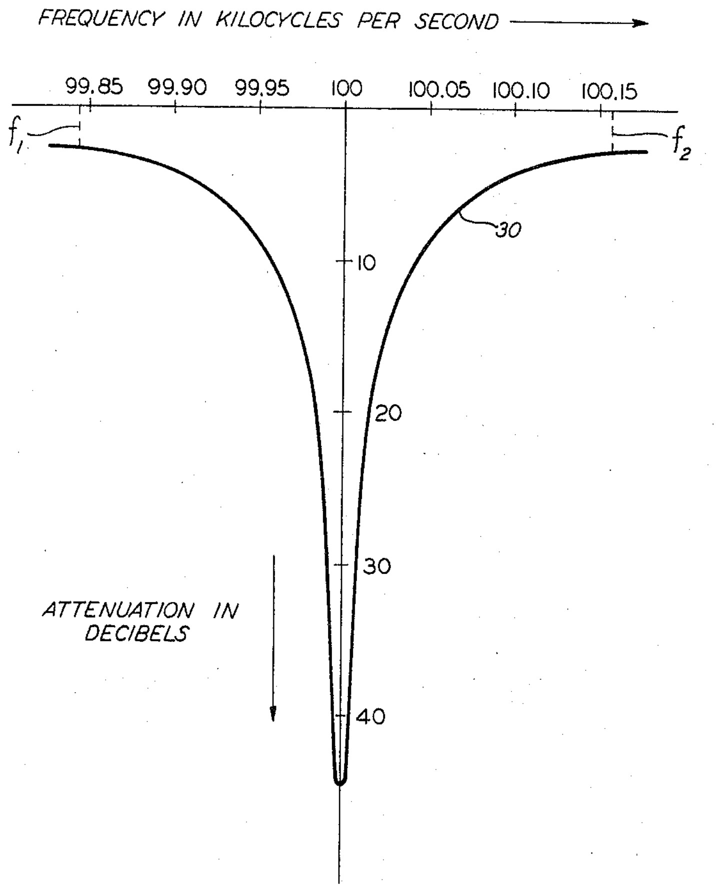

Additional features of the invention reside in the arrangements for stabilizing the transistor and bridged-T network against changes in their characteristics, such as temperature-responsive changes, as will become apparent from the following detailed description and the accompanying drawing in which:

FIG. 1 is a schematic and block diagrammatic showing of a preferred embodiment of the invention as applied in a telephone system; and FIG. 2 shows a curve of attenuation versus frequency for a representative design of the circuit of FIG. 1.

In FIG. 1, the signal source 1 is a telephone network including the sending network 6, the telephone line 5, and the buffer amplifier 8. The sending network 6 may representatively be the videotelephone transmitter disclosed in FIG. 1 of the copending application of E. F. Brown, Ser. No. 211,175, filed July 20, 1962. The frequencies $f_1$ and $f_2$ are representative of the band of frequencies required by a videotelephone signal and, for purposes of the present discussion, are assumed to be respectively lower and higher than the interfering frequency $f_3$. The presence of the interference source 7 in source 1 is not necessarily desired but is frequently unavoidable. For instance, source 7 may be a radiating object in the vicinity of the line 5 or my be an alternating-current source in sending network 6. For purposes of the present discussion, it will be assumed that source 7 is a 100 kilocycle per second frequency standard radiating into the telephone network. That is, $f_3$=100 kc.p.s. and is regulated to be constant.

Video display unit 2 is a part of a telephone station set. The videotelephone receiver disclosed in FIG. 2 of the above-cited application of E. F. Brown is representative of display unit 2. Video display unit 2 is capable of utilizing a received videotelephone signal, and does so most effectively when the interfering frequency $f_3$ is excluded from the received signal. The interfering frequency $f_3$ can cause several undesirable effects, such as introduction of moving stripes across the picture received in video display unit 2.

According to the invention, the emitter-collector circuit of transistor 4 is inserted in the transmission path so that it is effectively coupled serially with video display unit 2 across source 1. A bridged-T network 9 has an input coupled across the source 1 and an output coupled across the base-emitter junction of transistor 4 in an arrangement that provides a minimum alternating-current flow from the emitter to the collector of transistor 4 for the interfering frequency $f_3$, so that nearly all of the interfering signal voltage from source 1 appears across the emitter-collector circuit of transistor 4. At the same time, transistor 4 may be biased to provide essentially unimpeded current flow for the videotelephone signals having the representative frequencies $f_1$ and $f_2$.

More specifically, bridged-T network 9 comprises a tuned circuit 10, including inductor 12 connected across capacitor 11 and trimmer capacitor 24. Inductor 12 includes a plurality of sections, particularly an input section having $N_1$ turns and an output section having $N_2$ turns. Bridged-T network 9 further comprises a balancing impedance 27 connected from the junction of the input and output inductor sections to the emitter electrode of transistor 4. The other side of the input inductor section is connected to the grounded side of source 1. Inductive section $N_1$ and balancing impedance 27 thus form a voltage divider across source 1. The other side of the output inductor section is connected to the base electrode of transistor 4 through a biasing circuit including resistor 25 and bypass capacitor 26.

The balancing impedance 27 comprises the fixed resistor 13, the thermistor 20 in parallel with resistor 13. The balancing impedance 27 further comprises the inductor 21 and the variable resistor 22, both connected in series with the parallel combination of resistor 13 and thermistor 20.

The bias voltage source, $+V_{cc}$, is connected serially with resistor 16 and the base-emitter circuit of transistor 4 in a polarity to bias the base-emitter circuit for conduction. The bias voltage source, $+V_{cc}$, is also connected serially with resistor 15 and the emitter-collector circuit of transistor 4 in a polarity to bias the emitter-collector circuit for conduction. Resistor 23 is connected from collector to base of transistor 4 and supplies part of the base-emitter circuit bias, although its primary function is to provide negative feedback from the collector to the base of transistor 4. Under this condition the voltage gain, that is, the ratio of output to input voltages, is substantially the ratio of load impedance 15 to the source impedance 18. It is understood from the symbol employed that the negative terminal of $+V_{cc}$ is connected to the ground conductor.

Coupling capacitor 14 is connected from the collector of transistor 4 to one input terminal of video display unit 2.

In source 1, buffer amplifier 8 comprises transistor 17 having a base electrode connected through one conductor of telephone line 5 to one terminal of sending network 6. The collector electrode of transistor 17 is connected to the emitter electrode of transistor 4; and resistor 18 is connected from the collector electrode of transistor 17 to the remaining terminal of sending network 6 through the other conductor of telephone line 5. The latter terminal and the remaining terminal of display unit 2 are designated ground for convenience. It is noted that techniques are known in the art for balancing telephone line 5 at sending network 6 with respect to ground while providing an unbalanced transmission path between buffer amplifier 8 and video display unit 2. Resistor 19 is connected serially with bias voltage source $+V_{cc}$ and resistor 18 across the emitter-collector circuit of transistor 17.

Representative values for the circuit components are as follows:

| | | |
|---|---|---|
| Resistor 18 | | 1800Ω |
| Resistor 15 | | 2000Ω |
| Resistor 23 | | 56,000Ω |
| Capacitor 11 | pf | 1875 |
| Capacitor 24 | pf | 25 |
| Inductor 12 | mh | 1.35 |
| β of Transistor 4 | | 50 |
| Inductor 21 | μh | 100 |
| Q of Tank circuit 10 when unloaded | | 100 |

Effective Q of bridged-T network 9 and the circuit of transistor 4 together, Q eff.=1000 to 3000, where $$\frac{E_{out}}{E_{in}}=\frac{R_{15}}{R_{18}}\cdot\frac{1}{1+\dfrac{j2\dfrac{f}{f_3}}{Q\text{ eff.}\left(1-\left[\dfrac{f}{f_3}\right]^2\right)}}$$

Circuit components such as biasing resistors have conventional values. For any particular design, feedback resistor 23 can be adjusted until a Q eff. from 10 to 30 times the Q of the tank circuit 10 is obtained.

The impedance ratios within bridged-T network 9 are discussed more fully hereinafter in connection with the description of the operation of the invention.

In operation, sending network 6 and interference source 7 apply their respective signals to telephone line 5, which in turn transmits the composite signal to buffer ampliler 8. The output signal of buffer amplifier 8 appears across resistor 18 and is applied across the series combination of the emitter-collector circuit of transistor 4 and the load resistor 15, across which is connected the display unit 2. The signal across resistor 18 is also applied across the series combination of the balancing impedance 27 and the $N_1$ section of inductor 12, which, according to the preferred embodiment of the invention, provide substantially equal and predominately resistive impedances at the interference frequency $f_3$. The impedance supplied by the $N_1$ section of inductor 12 is predominately resistive because inductor 12 and the capacitors 11 and 24 resonate at the interference frequency $f_3$. Trimmer capacitor 24 permits adjustment of the resonant frequency.

In the preferred embodiment of the invention the inductance of the $N_2$ section is substantially equal to the inductance of the $N_1$ section, and the $N_2$ section is closely coupled with the $N_1$ section so that substantially equal voltages are induced in them.

With respect to the base and emitter electrodes of transistor 4, the induced voltage in the section $N_2$ at the interference frequency $f_3$ is opposite in polarity and nearly equal to the voltage across the balancing impedance 27 at the frequency $f_3$. It is essential that at frequency $f_3$ the voltage across the $N_2$ section be slightly less than the voltage across the balancing impedance 27, so that there is a small amount of negative feedback from the emitter-collector circuit of transistor 4 to the balancing impedance 27 and the $N_1$ section of inductance 12. Changes in circuit values with temperature changes and aging may otherwise produce sufficient positive feedback to cause the circuit to burst into oscillation.

It is, of course, apparent that the voltage divider ratio of impedance 27 to the inductive section $N_1$ may be changed if a corresponding change is made in the turns ratio of $N_2$ to $N_1$. In any case, a slight amount of negative feedback from the emitter-collector circuit of transistor 4 to the input of bridged-T network 9 must be maintained. Impedance 27 must be at least as large as the geometric means between the characteristic resonant impedances of sections $N_1$ and $N_2$.

Stability considerations tend to indicate that the value of impedance 27 should be 3% to 5% greater than the value required for a precise voltage null across the base-emitter junction of transistor 4 at the frequency $f_3$, resulting in a peak attenuation of about 44 db. This may be accomplished by varying resistor 22. Further increase of impedance 27 beyond the level just stated further decreases the attenuation of the circuit for the frequency $f_3$.

The attenuation of the frequency $f_3$ may be explained as follows. With no appreciable signal applied between the base and emitter electrodes of transistor 4 at the frequency $f_3$, the emitter and collector electrodes of transistor 4 will pass no appreciable alternating current at the frequency $f_3$. In other words, the effective impedance of the transmission network between source 1 and display unit 2 is very high. This impedance is of the order of 500 times as great as the parallel combination of the input impedance of display unit 2 and the resistance of resistor 15. Consequently, a negligible fraction of the $f_3$ signal appears across station set 2.

At the same time, the $N_1$ and $N_2$ sections of inductor 12 have an impedance for signals having the $f_1$ and $f_2$ frequencies that is negligible compared to their resonance impedances at the frequency $f_3$. Briefly, this is a consequence of the fact that $f_1$ and $f_2$ lie off resonance for the tank circuit 10 of bridged-T network 9. As a result of the low impedances of inductive sections $N_1$ and $N_2$ at the frequencies $f_1$ and $f_2$, transistor 4 appears esentially in a common base configuration between resistor 18 and station set 2 at the frequencies $f_1$ and $f_2$. The common base configuration inherently possesses a wide pass band of substantially uniform gain. This characteristic provides that the frequencies $f_1$ and $f_2$ may lie anywhere in a very large band of frequencies lying to either side of $f_3$. For the particular circuit design tabulated herein, $f_1$ may be as low as five cycles per second or as high as 99 kilocycles per second, and $f_2$ may be as high as 500 kilocycles per second or as low as 101 kilocycles per second with no more than $\pm 0.2$ db difference in transmission from a common value.

For the particular circuit design tabulated herein, the 3 decibel attenuation bandwidth is approximately 320 cycles per second, centered upon a frequency $f_3=100$ kilocycles per second. The 20 decibel attenuation bandwidth is approximately 30 cycles per second. The attenuation at 100 kilocycles per second is at least 40 decibles greater than that at the transmitted frequencies $f_1$ and $f_2$. The variation of attenuation with respect to frequency for the tabulated design of the circuit of FIG. 1 is summarized by curve 30 of FIG. 2.

Some further stabilization features of the invention may be particularly noted.

Since the circuit of FIG. 1 operates near the threshold of instability, thermistor 20 plays a very important role in the successful operation of the circuit by compensating the voltage divider ratio for temperature-dependent changes in the resonant impedances in tank circuit 10, particularly the resonant impedance supplied by inductive section $N_1$. Inductor 21 suppresses parasitic oscillations in inductor 12 which tend to occur at some relative high frequency $f_4$ because of the existence of some winding capacitance in inductor 12 and because of feedback through transistor 4. In addition, inductor 21 raises the knees of curve 30 of FIG. 2 by an appreciable amount. Negative feedback resistor 23 stabilizes the form of curve 30 against temperature-dependent changes and other changes in the parameters of transistor 4, such as $\beta$.

Various circuit modifications are possible. A pentode space discharge device may be substituted for transistor 4 by substituting cathode for emitter, control grid for base, and anode for collector. The screen and suppressor grids of the pentode would be biased conventionally with respect to the cathode.

In all cases, it is understood that the above-described arrangements are illustrative of a small number of the many possible specific embodiments which can represent applications of the principles of the invention. Numerous and varied other arrangements can readily be devised in accordance with those principles by those skilled in the art without departing from the spirit and scope of the invention.

What is claimed is:

1. A transmission network comprising a signal source capable of generating signals having frequencies $f_1$, $f_2$ and $f_3$, a load adapted for utilizing signals having the frequencies $f_1$ and $f_2$ to the exclusion of $f_3$, a bridged-T network having input and output terminals, said bridged-T network being characterized by maximum attenuation at said frequency $f_3$, means for coupling said signal source across said bridged-T network input terminals, a device having an input terminal, an output terminal, a variable impedance between said device input and output terminals, and a signal path for controlling said variable impedance, means for coupling said bridged-T network output terminals across said signal path, means directly connecting said signal source in series with the input terminal of said device, and means directly connecting said load in series with the output terminal of said device so that said bridged-T network is isolated from said load.

2. A transmission network according to claim 1 in which the bridged-T network comprises a tuned circuit adapted to resonate at the frequency $f_3$, said tuned circuit including an inductor having first, second and third taps, said second tap being positioned with respect to said first and third taps to experience intermediate induction potentials, a balancing impedance connected serially with said first and second taps across said bridged-T input terminals, said balancing impedance being connected serially with said second and third taps across said bridged-T output terminals, said inductor providing negligible impedance in series with the signal source and the control signal path at the frequencies $f_1$ and $f_2$.

3. A transmission network according to claim 2 in which the tuned circuit provides a first characteristic impedance $Z_{k_1}$ between the first and second inductor taps at the frequency $f_3$, said tuned circuit also providing a second characteristic impedance $Z_{k_2}$ between the second and third inductor taps that is substantially equal to the first characteristic impedance $Z_{k_1}$ at the frequency $f_3$, the balancing impedance being at least as large as the geometric mean between said impedances $Z_{k1}$ and $Z_{k2}$.

4. A transmission network comprising a signal source capable of generating signals having frequencies $f_1$, $f_2$ and $f_3$, a load for utilizing signals having the frequencies $f_1$ and $f_2$ to exclusion of $f_3$, a tuned circuit adapted to resonate at the frequency $f_3$, said tuned circuit including a capacitor and an inductor having first and second portions connected serially across said capacitor, a balancing impedance connected serially with said source across said first inductor portion, a transistor with base, emitter, and collector terminals having a base-emitter signal path connected serially with said balancing impedance across said second inductor portion, said transistor having an emitter-collector signal path characterized by an impedance responsive to signals applied to said base-emitter signal path, said emitter terminal being directly connected to said signal source, said collector terminal being directly connected to said load so that said load is isolated from said tuned circuit, and said balancing impedance being proportioned with respect to said first and second inductor portions to make said signal-responsive impedance a maximum at said signal frequency $f_3$.

5. A transmission network according to claim 4 in which the tuned circuit provides first and second characteristic impedances respectively across the first and second inductor portions at the signal frequency $f_3$, and said balancing impedance has an impedance at least as large as the geometric mean of said first and second characteristic impedances.

6. A transmission network according to claim 4 in which the first and second inductor portions provide a low impedance path at the signal frequencies $f_1$ and $f_2$ in series with the signal source and the transistor base-emitter signal path, said network additionally including means for biasing said transistor to provide a specified amplification of the signals having said frequences $f_1$ and $f_2$.

7. A transmission network according to claim 6 in which the signal source is a first telephone network, said first telephone network transmitting intelligence signals having the frequencies $f_1$ and $f_2$, said first telephone network being disturbed by induced signals at the frequency $f_3$, and in which the load is a second telephone network capable of utilizing said intelligence signals having said frequencies $f_1$ and $f_2$ with greater facility in the absence of than in the presence of said signals having said frequency $f_3$.

8. A transmission network according to claim 7 in which the first and second telephone networks are arranged and adapted to transmit baseband television signals having a frequency band of which the frequencies $f_1$ and $f_2$ are representative, said first telephone network including an alternating-current power source having the frequency $f_3$ regulated to be constant, said power source being the source of the disturbing induced signals at said frequency $f_3$.

9. A transmission network comprising a source of signals having the frequencies $f_1$, $f_2$ and $f_3$, a utilization circuit for signals having the frequencies $f_1$ and $f_2$ to the exclusion of $f_3$, a capacitor, a first inductor tuned with said capacitor to the frequency $f_3$, said first inductor having first and second portions connected serially across said capacitor, said first inductor being capable of self-resonance at the frequency $f_4$, and further having a characteristic impedance that changes with temperature, a balancing impedance connected serially with said first portion of said first inductor across said source, said balancing impedance having a common junction with said first and second portions of said first inductor, a transistor having base, emitter and collector electrodes, said balancing impedance and said second portion of said first inductor being connected serially across said base and emitter electrodes, said first and second portions of said first inductor forming a low impedance path between said base electrode and said source at said frequencies $f_1$ and $f_2$, means for biasing said transistor for current conduction, and a negative feedback impedance connected from said collector electrode to said base electrode, said emitter and collector electrodes being connected serially with said utilization circuit across said source, said balancing impedance including a principal resistor and a temperature-sensitive variable resistor, said variable resistor varying in a sense to compensate changes in said characteristic impedance of said inductor, said balancing impedance further including an inductor connected serially with said principal resistor and adapted for suppressing said self-resonance of first inductor at said frequency $f_4$.

10. A tranmission network according to claim 9 in which the first and second portions of the first inductor are proportioned with respect to the balancing impedance to provide a selected magnitude of attenuation between the source and the base and emitter electrodes of the transistor for signals having the frequency $f_3$.

11. A transmission network according to claim 10 in which the principal resistor of the balancing impedance includes a portion that is adjustable to permit selection of the magnitude of attenuation, and the capacitor includes a portion that is adjustable to provide said selected attenuation for signals having a variant frequency $f_3$.

References Cited

UNITED STATES PATENTS

| | | | |
|---|---|---|---|
| 2,745,068 | 5/1956 | Gannett | 333—80 |
| 2,823,357 | 2/1958 | Hall | 333—80 |
| 2,852,751 | 9/1958 | Lundry | 333—28 |
| 2,915,711 | 12/1959 | Stanford | 332—52 |
| 2,928,001 | 3/1960 | McLean | 333—75 |
| 3,174,111 | 3/1965 | Grover | 330—28 |

HERMAN KARL SAALBACH, *Primary Examiner.*

C. BARAFF, *Assistant Examiner.*